United States Patent [19]

Holt

[11] 3,924,267

[45] Dec. 2, 1975

[54] SCAN CONVERTING VIDEO TAPE RECORDER

[75] Inventor: Norman I. Holt, East Pasadena, Calif.

[73] Assignee: The United States of America as represented by the United States National Aeronautics and Space Administration Office of General Counsel-Code GP, Washington, D.C.

[22] Filed: Oct. 27, 1971

[21] Appl. No.: 192,803

Related U.S. Application Data

[63] Continuation of Ser. No. 668,116, Sept. 15, 1967, abandoned.

[52] U.S. Cl. ........................ 360/9; 360/10; 360/35; 360/101

[51] Int. Cl.² ........................ H04N 5/79

[58] Field of Search .................... 178/6.6 A, 6.6 FS; 179/100.2 T; 360/9, 10, 35, 101

[56] References Cited

UNITED STATES PATENTS

| | | | |
|---|---|---|---|
| 2,648,589 | 8/1953 | Hickman | 179/100.2 T |
| 2,986,725 | 5/1961 | Dirks | 179/100.2 T |
| 3,170,031 | 2/1965 | Okamura | 179/100.2 T |
| 3,317,679 | 5/1967 | Rank | 179/100.2 T |

*Primary Examiner*—Raymond F. Cardillo, Jr.
*Attorney, Agent, or Firm*—Monte F. Mott; Paul F. McCaul; John R. Manning

[57] ABSTRACT

A video tape recorder having sufficiently broad bandwidth capabilities for recording color television signals, and which has the capability of playing back the recorded television signals at a scan rate different from that at which the signals were recorded, so that television signals of one scanning standard may be converted to television signals of a second scanning standard.

11 Claims, 4 Drawing Figures

INVENTOR:
Norman I Holt
By Thomas D. Linton
ATTORNEY

INVENTOR:
Norman I. Holt

By Thomas D. Linton, Jr.

ATTORNEY

SCAN CONVERTING VIDEO TAPE RECORDER

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

This application is a continuation of application 668,116 filed Sept. 15, 1967 now abandoned.

BACKGROUND OF THE INVENTION

It has been the practice in the reception of television signals produced at a low scanning rate, by a space probe, for example, to store the received signals on a cathode ray storage tube and subsequently to read the signals from the storage tube at a higher scanning rate. However, the use of such a storage tube introduced aberrations into the received television signal due to halation effects in the screen of the storage tube. An important feature of the present invention is the elimination of the storage tube and the provision of a system in which the television signals may be converted from one scanning standard to another, quickly and without the introduction of any aberrations or other distortions into the signals.

The video tape recorder of the present invention was constructed originally for recording television signals produced, for example, by a space probe at a relatively low scanning rate, and for subsequently reproducing the recorded television signals at a relatively high scanning rate so that the signals could be reproduced by conventional monitors, and in order that the signals could be read directly into a usual present day electronic digital computor. The computer was used to process the received television signals so as to enhance their contrast and to remove distorting interference therefrom.

However, the video tape recorder of the present invention has general utility wherever it is desired, for example, to convert television signals from one scanning standard to another. Such a conversion would permit, for example, television signals produced at European standard scanning rates to be received in the United States and rebroadcast at the United States standard scanning rate.

The video tape recorder to be described is capable of converting television signals of one frame or field rate into television signals of a second frame rate. The recorder could be constructed to convert television signals of a first line scanning rate into television signals of a second line scanning rate. However, this would normally require excessively high speed operation, construction to excessively close tolerances, and discs of extremely small diameter.

A more convenient line scan conversion may be achieved by using the recorder of the invention to convert the frame rate to a desired relatively high value and to reproduce the picture on a high resolution cathode ray tube. The reproduced picture may then be scanned by a usual television transmitting tube and rebroadcast. There is no material "storage" of the television signals in the cathode ray tube, since the pictures reproduced thereby are immediately sensed by the transmitting tube. Therefore, there is no aberration problem as in the prior art storage tube.

Thus, the apparatus of the invention may be used to perform the functions of the prior art storage tube system without the aberration effects due to halation or "blooming" of the storage tube screen; with higher intensity and with a longer grey scale.

In addition, the video tape recorder of the present invention may be used for record storage purposes. For example, a large number of printed or pictorial documents may be stored in a record storage system which includes the tape recorder of the invention, and any one of these records may be selected at a relatively rapid retrieval rate.

Therefore, the scanning converter video recorder of the present invention may be advantageously used in the recording of slow-scan television signals, and in converting the slow-scan television signal into a relatively high scan type which may be readily processed by conventional present day digital computers and which can be readily displayed by present day conventional television monitors. Furthermore, the recorder of the invention can be used advantageously in a document storage and retrieval system because of its high storage capabilities and high retrieval speed. In this latter aspect, and as will be described herein, appropriate indexing indicia may be recorded along the tape to assist in the data retrieval.

The output of the video recorder of the invention may be fed directly to a standard television monitor, or re-recorded, or routed through an electro-optic interface as mentioned above to a television transmitter for re-broadcast. The electro-optic interface allows all world standards, monochrome or color, to be translated from any one standard to another.

A constructed embodiment of the invention, for example, exhibits the capability of recording a frequency modulated television signal of a mean carrier frequency of 8 MHz, and with a frequency variation of 0.1 MHz to 10 MHz. In addition, the constructed embodiment exhibits the capability of recording and playing back documents in color; of recording binary bits at rates up to 5,000,000 bits per second; and of providing storage up to 360,000 frames on a 10,000 foot roll of one inch magnetic tape. The constructed embodiment also has the capability of erasing and reinserting new data at any bit or word position.

SUMMARY OF THE INVENTION

The scanning converter video recorder of the invention includes a fixed drum and magnetic tape wound helically around the drum. A pair of electromagnetic transducer heads is mounted within the drum for rotation about the longitudinal axis of the drum. The two transducer heads are positioned adjacent one another, and they extend through a peripheral opening in the drum so as to sweep diagonally across the magnetic tape while it is momentarily held stationary during its helical traverse of the drum. By such an assembly, the two heads are swept in a series of diagonal paths across the drum.

One of the two transducer heads is a record head, and it is rotated within the fixed drum at a first rotational speed, so that signals introduced to that head may be recorded in the diagonal tracks on the tape at a first predetermined scanning rate. The second transducer head is a playback head, and it is rotated within the drum at a rotational speed different from the speed of rotation of the recording head. This enables the signals recorded in the diagonal track by the recording head to be instantly reproduced by the playback head, but at a different predetermined scanning rate.

Normal operation of the assembly will record one frame or field of a received television signal per revolution of the record head. As mentioned above, however, under high speed shaft conditions requiring discs and bearings of extremely precise construction, a single line of the received television signal could be recorded for each revolution of the record head. However, this would require discs of the order of 0.5 inches diameter and a correspondingly dimensioned tape carrying drum. As noted above, the construction for line conversion of the signal, rather than frame conversion does not appear to be too feasible from a mechanical construction standpoint.

DESCRIPTION OF THE PREFERRED EMBODIMENTS

Figure 1:
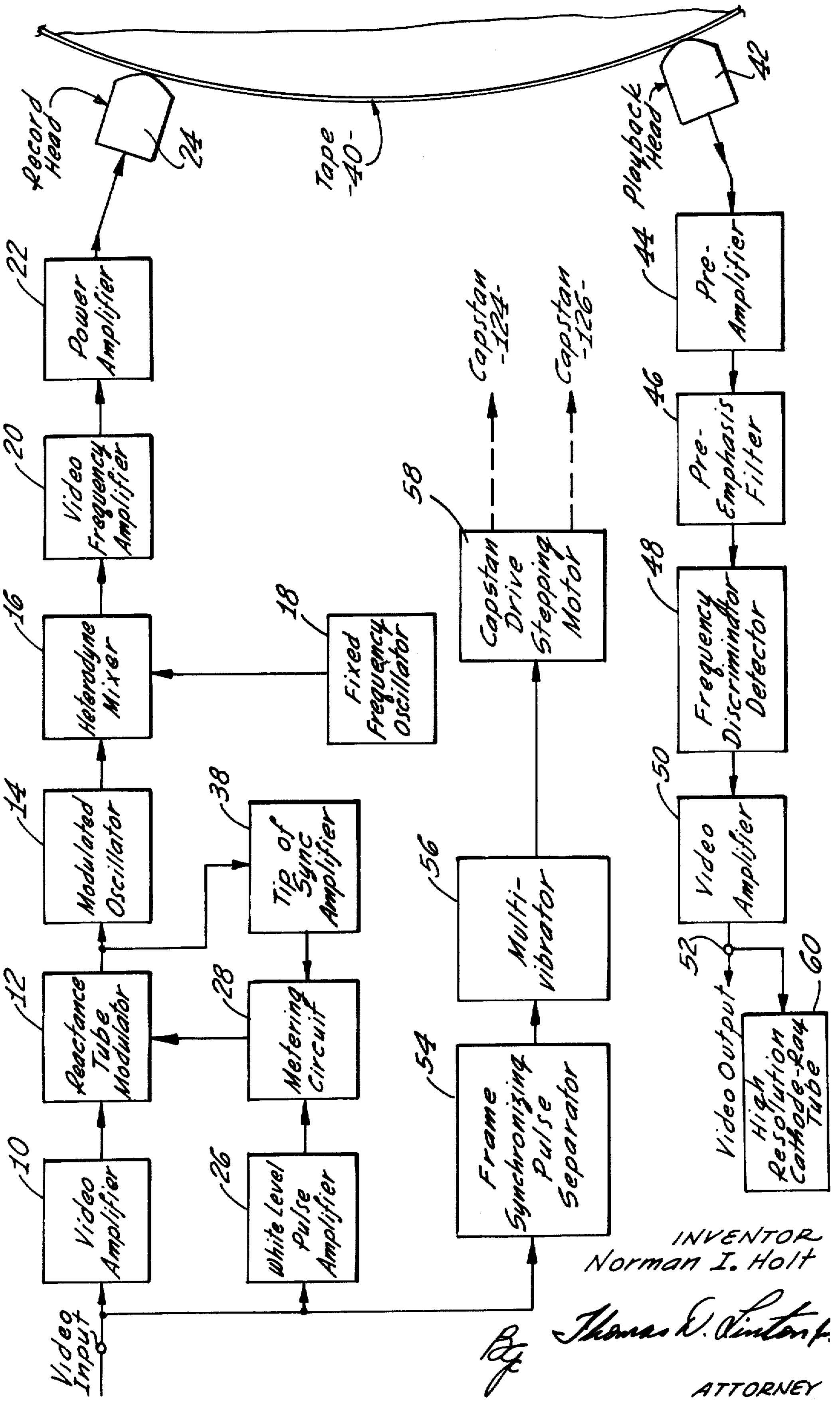
FIG. 1 is a block diagram of a typical system suitable for processing the video signals for recording on the tape, for controlling the tape, and for subsequently processing the video signals reproduced from the tape.

The system shown in FIG. 1 includes a video amplifier 10 which responds to the incoming video input and amplifies it. The output from the video amplifier 10 is introduced to a reactance tube modulator 12 which, in turn, is coupled to a modulated oscillator 14.

The output from the modulated oscillator 14 is heterodyned to a predetermined intermediate frequency by a heterodyne mixer 16. A fixed frequency oscillator 18 is also coupled to the heterodyne mixer 16. The output from the heterodyne mixer 16 is amplified in a video frequency amplifier 20 whose output, in turn, is amplified in a power amplifier 22 and applied to a record head 24.

The video input is also introduced to a white level pulse amplifier 26, the output of which is passed to a metering circuit 28. The reactance tube modulator 12 is also coupled to a "tip of sync" amplifier 38 which, in turn, is coupled back to the metering circuit 28. The output from the metering circuit is applied to the reactance tube modulator 12.

The record head 24 is magnetically coupled to a tape 40, as is a playback head 42, as will be described in more detail subsequently. The output from the playback head is amplified in a preamplifier 44, and the output of the preamplifier is passed through a preemphasis filter 46 to a frequency discriminator detector 48. The resulting video output from the detector 48 is amplified in a video amplifier 50 and passed to the output terminal 52 of the system.

It will be appreciated that a frequency modulated video signal is applied to the record head 24. The incoming video information is amplified in the video amplifier 10, and is applied to the reactance tube modulator 12. The reactance tube modulator, in accordance with usual practice, is voltage regulated so as to be frequency stable. Therefore, any variations in the output of the reactance tube modulator are due solely to the amplified video signal derived from the video amplifier 10. The reactance tube modulator produces an analog output voltage which varies in amplitude in accordance with variations in the incoming video signal. This voltage is used to modulate the modulated oscillator 14. The resulting modulated carrier signal from the modulated oscillator 14 is heterodyned to the selected video frequency by the heterodyned mixer 16. This is achieved by heterodyning the output from the modulated oscillator 14 with the fixed frequency output from the oscillator 14 with the fixed frequency output from the oscillator 18.

The aforesaid heterodyne action is such, for example, that the center frequency of the signal applied to the video frequency amplifier 20 is of the order of 8 MHz. The output of the video amplifier is subsequently amplified by the power amplifier 22, which is impedance matched with the recording head 24, and which is capable of driving the recording head with optimum efficiency.

The white level pulse amplifier 26 is also driven by the video amplifier, and the white level amplifier drives the metering circuit 28. The metering circuit 28 is of any known type, and it operates to set the level of the white peaks of the incoming video signal and the tips of the synchronizing components of that signal. The amplifier 38 responds to the peak output of the reactance tube modulator 12, and applies it, after amplification, to the metering circuit 28. The reactance tube output is also clamped to return the signal to the reference black level so as to prevent drift over the Gray scale. This action clamps the modulated oscillator at a fixed frequency at the beginning of each horizontal synchronizing component so that each line of the successive frames commences at the same basic frequency representing, for example, the black level of the incoming signals.

The playback circuit made up of the components 44, 46, 48 and 50 is also a conventional frequency modulation detecting system. This latter system accepts the signal from the playback head and amplifies it in the pre-amplifier 44 which is impedance matched with the playback head 42. The output of the pre-amplifier 44 is passed through the pre-emphasis filter 46 to equalize the frequency response. The signal is then applied to the frequency discriminator detector 48 which detects the video signal and the resulting video signal is amplified in the video amplifier 50 and applied to the output terminal 52.

Figure 2:
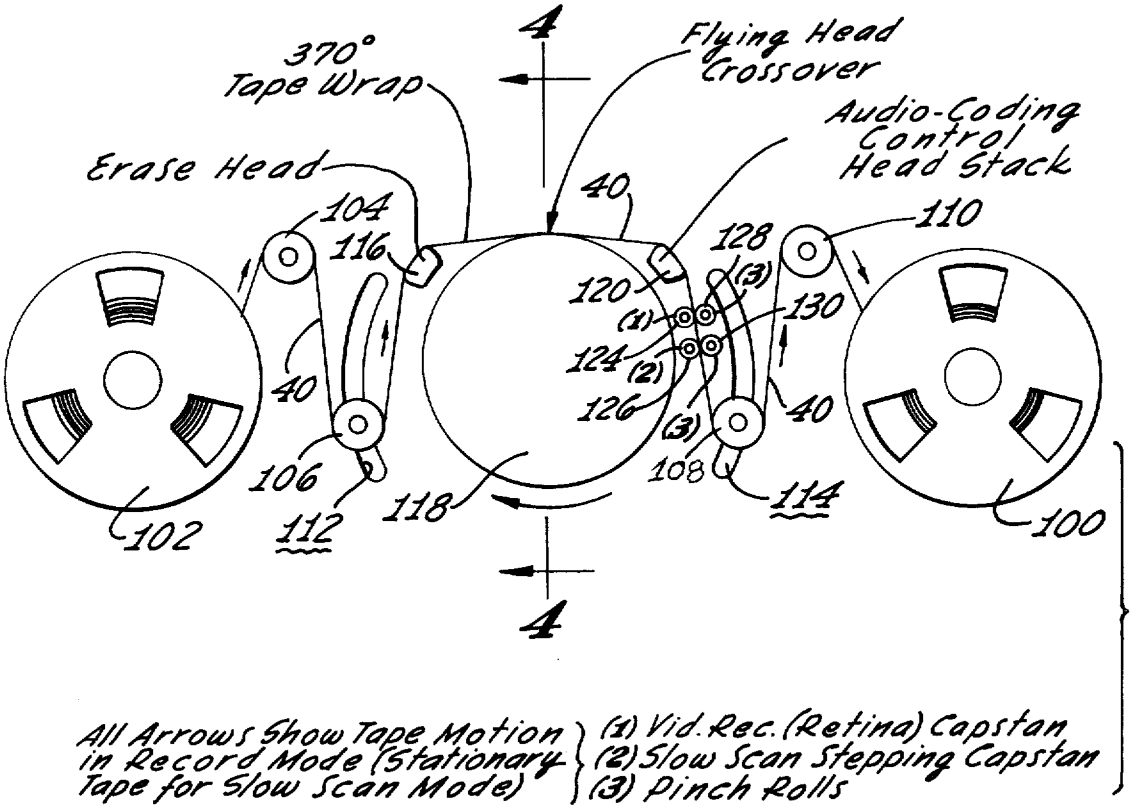
FIG. 2 is a schematic representation of the tape transport showing the manner in which the tape is drawn around a fixed drum, in the practice of the invention.

The tape transport system shown in FIG. 2 includes a take-up reel 100, and a supply reel 102. The tape 40 is drawn from the supply reel 102 to the take-up reel 100 around rotatable tape guides 104, 106, 108 and 110. The guides 106 and 108 are movable in slots 112 and 114, so as to maintain the tape in a taut condition, as it is drawn from the supply reel to the take-up reel. This is achieved by providing a torque servo in conjunction with the drive motors for the reels, these servos being coupled to the respective movable guides 106 and 108, to move them along their respective grooves 112 and 114 so as to maintain constant tension on the tape.

The tape moves from the supply reel 102 and threads through the rotatable guide 104 and 106 past an erase head 116, and then extends helically through, for example, 370° around a fixed drum 118. The erase head 116 is constructed to extend across the entire tape width, so as to erase all the information previously stored on the tape prior to its being drawn around the drum 118. For example, a one-inch width tape may be used, as was the case in the constructed embodiment. The peripheral surface of the drum 118 may be coated with a suitable lubricating plastic, such as a Teflon, for example, in order to reduce the frictional force. This permits the tape to be wound throughout the 370° without producing excessive tape drag.

As will be described, the record head 24 and playback head 42 of FIG. 1 are mounted on rotating discs within the drum 118, and these discs extend through a circumferential opening in the drum. This permits the head 24 to record the successive lines of the video signal in successive diagonal tracks extending across the tape 40, and it permits the playback head 42 to reproduce the information on the successive diagonal tracks at a different scanning rate. Reproduction of the recorded track at a different scanning rate can only be carried out while the tape is stationary, otherwise, if, the tape is moving and the reproduce head rotates at a higher rate than the record head the record head will pick up only part of a recorded track. If the record head rotates slower than the read head it will pick up parts of successive recorded tracks.

After the tape has passed around the drum 118, it is moved across a further recording electromagnetic transducer head stack 120. This further head stack may be utilized to encode further information on the tape along additional tracks which extend longitudinally of the tape. For example, the head stack 120 may be utilized to encode binary, audio and gray scale information on the track, and may be used for automatic retrieval of information from the diagonal tracks by providing address information thereon.

The head stack 120, for example, may be a 3-track head so that two audio tracks and one control track may be recorded longitudinally along the edge of the tape 40. Then, one of the audio tracks may be used as a binary code track for the retrieval of information from the successive diagonal tracks, when the tape is used for the storage of documents. This is achieved, for example, in a well known manner, by recording successive address information relating to the various diagonal tracks, and then by comparing the address information with desired address information in comparator circuits.

Such comparator circuits, as well as the detailed circuitry of the blocks of FIG. 1, are well known to the art, and for that reason need not be described in detail in the present specification.

The control track may be used to record a suitable synchronizing signal, in order that the recorded data may be maintained in alignment with the usual clock pulses, thereby enabling known and appropriate speed controls for the tape to be incorporated into the system.

The system shown in FIG. 2 is driven by capstans 124 and 126. When the system is first energized the rollers 128 and 130 press the tape against the capstans. The capstans are driven by a stepping motor, synchronized with the frame synchronizing pulses of the received television signal, to move the tape 40 incrementally from one diagonal track to the next. This movement, for example, may be of the order of 0.005 inches from the previously recorded track. The operation of the system is such that one frame of the received television signal is recorded in a diagonal track by the rotation of the record head 24 while the tape is at rest, and then the tape is stepped to the next diagonal track, and the operation is repeated for the next frame. While the tape is stopped for a record operation a read operation of the previously recorded track at a different rate than the recording operation rate takes place to cause scan conversion. The frame synchronizing pulses from the received television siganl are used to actuate the capstans 126 and 128 to move the tape 40 to a new position, 0.15 inches further along the tape, to record the next frame of video information by the record head 24. These specific figures correspond, for example, to a track width of 0.010 inches, and a track spacing of 0.005 inches.

Figure 4:
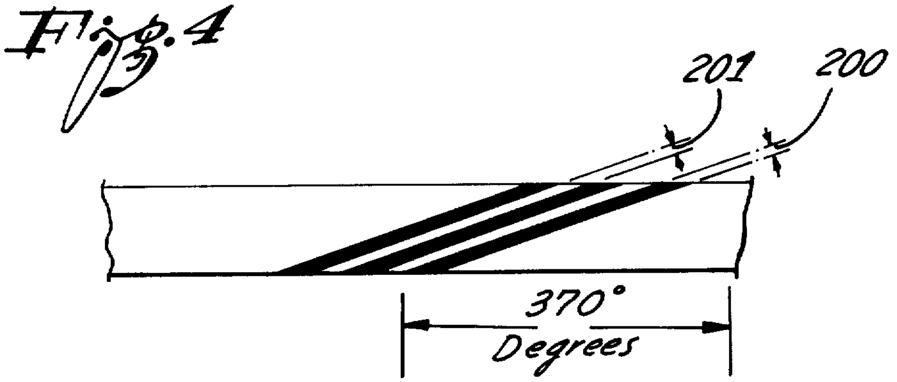
FIG. 4 is a schematic representation of the tape, showing the manner in which the video signals are recorded in diagonal paths extending across the tape.

The control mentioned in the preceding paragraph may be carried out by the system represented by the blocks 54, 56 and 58 in FIG. 1. During the record mode, for example, a frame synchronizing pulse separator 54 separates the frame synchronizing pulses from the incoming television signal. These pulses are used to trigger a multivibrator 56 which, in turn, energizes a capstan drive stepping motor 58 from one step to another. The motor 58, therefore, imparts the desired motion to the capstans 124 and 126 at the end of each frame of the received television signal to step the tape 40 from one diagonal track to the next, as shown in FIG. 4.

By imparting a stepping motion to the tape, not only is scan conversion made possible by using a concentrically rotating record and read head but there are other benefits. When the tape is stopped it is not under any pulling or moving tension and thus problems created by tape skew or tape deformation are avoided. This is important since skew or deformation can cause the distortion or loss of recorded data.

The output of the video amplifier 50 may be applied to a high resolution cathode ray tube 60. This tube is synchronized with the incoming television signal to be driven at the same line scan rate, and it is synchronized with the recorder to be driven at the reproduce head frame rate.

The cathode ray tube 60 forms an electro-optic interface and, as explained above, it permits all world television standards, monochrome or polychrome, to be translated from any one standard to another.

Figure 3:
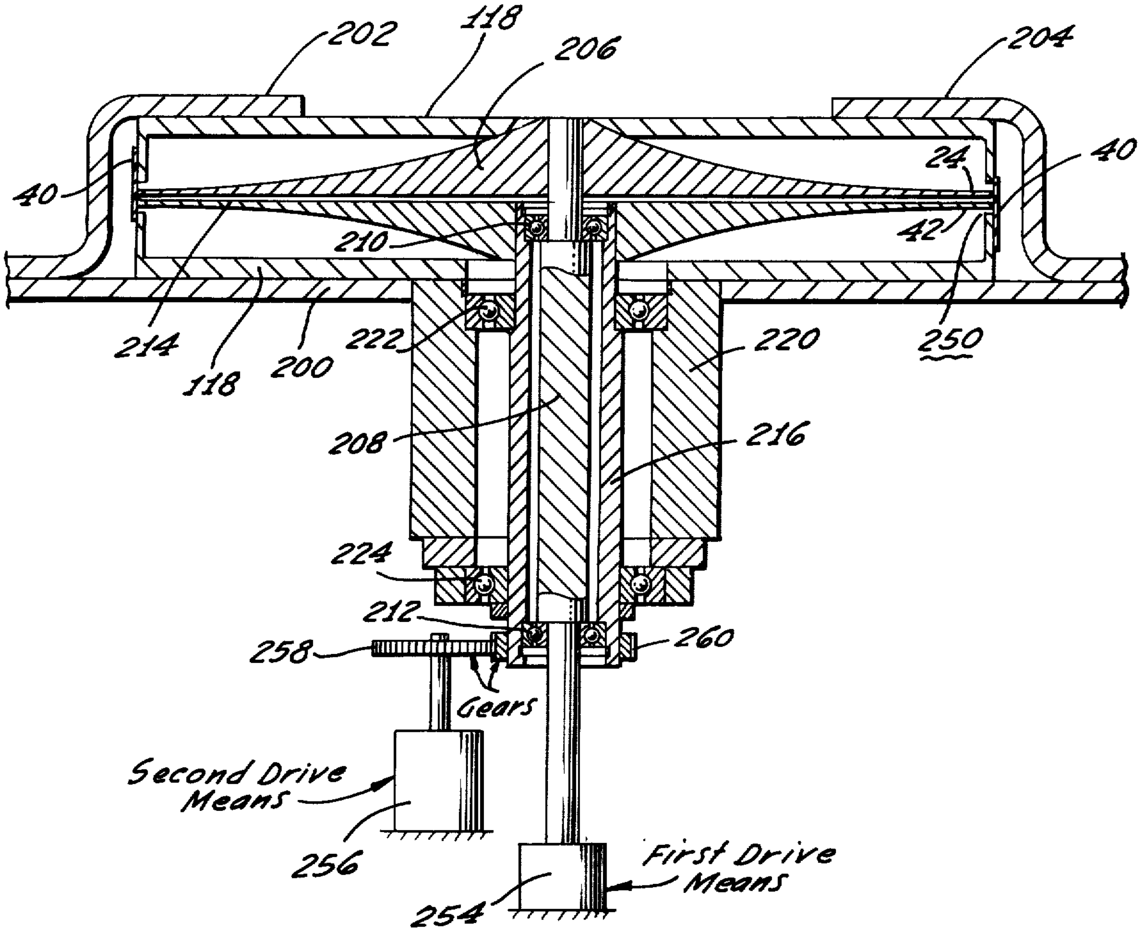
FIG. 3 is a cross sectional ivew of the aforesaid fixed drum assembly, showing the manner in which the transducer heads are rotatably mounted within the drum.

The drum 118 may have the form shown in the sectional view of FIG. 3, and it may be mounted on a base 200 and supported thereon by appropriate brackets 202 and 204. The record head 24, for example, may be mounted on a first disc 206 which is rotatably mounted in the drum by means, for example, of a shaft 208 mounted on appropriate bearings 210 and 212. The playback head 42, on the other hand, may be mounted on a disc 214 which is positioned adjacent the disc 206, and which is mounted for rotation on a tubular shaft 216 which, in turn, is supported in a fixed hub 220 by bearings 222 and 224. The discs 206 and 214 are mounted for rotation about the longitudinal axis of the drum 118. The drum has a circumferential opening 250 therein through which the heads 24 and 42 extend.

The tape 40 is helically drawn across the opening. When the tape stops the head 24 which is spinning within the drum, records signals in a diagonal track, such as shown in FIG. 4. The tape is then stepped an increment of motion to place the track, which has just been recorded under the playback head. The playback head 42 follows in the diagonal track of the previously recorded line of information. At this time the record head is also driven to record the next frame of information. Thus, the tape is stepped along and each time it stops both a record and a read operation occurs. The disc 206, and the record head 24 are rotatably driven by a first driven means 254, which is coupled to the shaft 208. The disc 214 and the playback head 42, on the other hand, are driven by a second drive means 256 which is coupled through appropriate gears 258 and 260 to the tubular shaft 216. The drive means 254 and 256 may be appropriate electric motors, and these are controlled to drive the record head 24 and playback head 42 at predetermined different rotational speeds to produce any desired scan conversion, either step up or step down.

The length of the tape 40 wrapped around the drum 18 in a helical path may be on the order of 370° which, in the constructed embodiment, corresponds to about 56 inches. The track width 200 in the constructed embodiment, is of the order of 0.010 inches, and the track spacing 201 is of the order of 0.005 inches. The additional control and audio tracks which are recorded lengthwise along the edge of the tape are not shown.

The invention provides, therefore, an improved system and apparatus which in one of its aspects permits slow scan television signals to be converted to high scan without the playback for a cathode ray storage tube and its attendant limitations. In another of its aspects, the improved apparatus and system of the invention permits television signals of any standard to be converted to another, again without the need for a storage tube. Also, the scan conversion is achieved without any of the problems which can be caused by tape skew or moving tension.

What is claimed is:

1. A magnetic tape recording apparatus for recording signals at a first scanning rate in a series of diagonal tracks extending across a magnetic tape and for playing back the recorded signals at a second scanning rate, said apparatus including:

means for guiding said tape in a helical path about a predetermined axis, means for moving said tape in stepping increments through said helical path to provide successive intervals when said tape is stopped, means for recording a line of signals diagonally across said tape when said tape is stopped including:

an electro-magnetic transducer record head, and means for rotating said record head at a first rotational speed about said predetermined axis while in magnetically coupled relation with said tape as said tape is guided through said helical path; and means for reproducing a previously recorded line of signals while said tape is stopped for recording icluding, an electromagnetic transducer read head; and means for rotating said read head at a second rotational speed higher than said first rotational speed about said predetermined axis while in magnetically coupled relation with said tape as said tape is guided through said helical path.

2. A magnetic tape recording apparatus as recited in claim 1 including means for moving said tape in stepping increments in synchronism with said signals being recorded.

3. A magnetic tape recording apparatus as recited in claim 1 wherein said means for moving said tape in said helical path in stepping increments includes means for moving said tape in syncronism with said signals being recorded the distance between recorded lines of signals for positioning a line of signals which has been previously recorded by said record head under said playback head.

4. A magnetic tape recording apparatus for recording signals at a first scanning rate in a series of diagonal tracks extending across a magnetic tape and for playing back the recorded signals at a second scanning rate, said apparatus including:

a drum member;

means for guiding a magnetic tape in a helical path around said drum member;

means for moving said tape in said helical path in stepping increments to provide successive intervals when said tape is stopped, means for recording a line of signals diagonally on said tape when said tape is stopped, including:

an electro-magnetic transducer record head and means for mounting said record head within said drum member for rotation about a particular axis while in a magnetically coupled relationship with the tape;

an electro-magnetic transducer plaayback head, and means mounting said playback head within said drum for rotation about said particular axis while in a magnetically coupled relationship with the tape for reading a previously recorded line of signals when said tape is stopped for recording;

first drive means mechanically coupled to said record head for driving said record head at a first rotational speed; and second drive means coupled to said playback head for driving said playback head at a second rotational speed which is higher than said first rotational speed.

5. The magnetic tape recorder recited in claim 4 in which said drum member has a circumferential slot therein which extends diagonally across the tape as the tape is drawn along said helical path around said drum; and in which said record head and playback head extend through said slot.

6. The magnetic tape recorder defined in claim 4 in which the surface of said drum is coated with a lubricating plastic material to reduce the frictional force between the tape and said drum.

7. The magnetic tape recorder defined in claim 4 in which the tape is wound helically around said drum through an angular distance in excess of 360°.

8. The magnetic tape recorder defined in claim 4 in which said record head and said playback head are coaxially mounted adjacent one another for rotation about the axis of said drum.

9. The magnetic tape recorder defined in claim 4 and which includes first and second coaxial discs rotatably mounted in said drum for rotation about the longitudinal axis thereof, means for supporting said record head on the periphery of one of said discs, and means for supporting said playback head on the periphery of the other of said discs.

10. The magnetic tape recorder defined in claim 4 and which includes an additional electro-magnetic record head mounted to be magnetically coupled to the tape along a track extending longitudinally with respect to the tape.

11. A magnetic tape recording apparatus for recording signals at a first scanning rate in a series of diagonal tracks extending across a magnetic tape and for subsequently playing back the recorded signals at a second scanning rate, said apparatus including:

a drum member having a circumferential slot therein;

means for guiding a magnetic tape in a helical path around said drum so that said slot extends diagonally across the tape as the tape is so guided along said helical path;

means for moving said tape in said helical path in synchronism with said signals being recorded and in stepping increments to provide successive intervals when said tape is stopped;

means for recording a line of signals diagonally on said tape when said tape is stopped including:

an electromagnetic transducer record head;

means for mounting said record head within said drum for rotation about a particular axis while extending through said slot into magnetically coupled relationship with the tape as the tape is drawn along said helical path around said drum;

means for reading a previously recorded line of signals when said tape is stopped for recording including, an electromagnetic transducer playback head, and means mounting said playback head within said drum for rotation about said particular axis while extending through said slot into magnetically coupled relationship with said tape as said tape is drawn along said helical path;

first drive means mechanically coupled to said record head for driving said record head at a first rotational speed; and second drive means coupled to said playback head for driving said playback head at a second rotational speed, which is greater than said first rotational speed.

* * * * *